United States Patent
Toyoda et al.

(10) Patent No.: US 7,754,815 B2
(45) Date of Patent: *Jul. 13, 2010

(54) PROCESS FOR PRODUCING THERMOPLASTIC ELASTOMER COMPOSITION, AND AIR-BAG COVER

(75) Inventors: Hiroshi Toyoda, Chiba (JP); Noboru Komine, Chiba (JP); Hiroyuki Harada, Sodegaura (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 778 days.

This patent is subject to a terminal disclaimer.

(21) Appl. No.: 11/300,478

(22) Filed: Dec. 15, 2005

(65) Prior Publication Data

US 2006/0199909 A1  Sep. 7, 2006

(30) Foreign Application Priority Data

Mar. 7, 2005 (JP) .............................. 2005-061956

(51) Int. Cl.
- *C08L 9/00* (2006.01)
- *C08L 23/04* (2006.01)
- *C08L 23/06* (2006.01)
- *C08L 23/10* (2006.01)
- *C08L 45/00* (2006.01)
- *C08L 55/00* (2006.01)
- *C08K 5/00* (2006.01)

(52) U.S. Cl. ........................ 525/191; 525/210; 525/211; 525/232; 525/240; 524/515; 524/518; 524/526

(58) Field of Classification Search ................... 525/191, 525/210, 211, 232, 240; 524/515, 518, 526
See application file for complete search history.

(56) References Cited

U.S. PATENT DOCUMENTS

| | | | |
|---|---|---|---|
| 5,861,463 A * | 1/1999 | Sehanobish et al. | ......... 525/240 |
| 6,476,139 B2 | 11/2002 | Akaike et al. | |
| 2007/0225446 A1 * | 9/2007 | Nakano et al. | ............... 525/240 |

FOREIGN PATENT DOCUMENTS

| | | |
|---|---|---|
| JP | 08-27331 A | 1/1996 |
| JP | 10-265628 A | 10/1998 |
| JP | 2001-279030 A | 10/2001 |

* cited by examiner

*Primary Examiner*—Nathan M Nutter
(74) *Attorney, Agent, or Firm*—Sughrue Mion, PLLC

(57) ABSTRACT

A process for producing a thermoplastic elastomer composition comprising the step of crosslinking dynamically at least the following components (A) to (C) in the presence of a crosslinking agent: (A) 10 to 50% by weight of an oil-extended ethylene-α-olefin-non-conjugated diene copolymer rubber having a density of 850 to 900 kg/m$^3$, and a Mooney viscosity ($ML_{1+4}$ 100° C.) of 30 to 150, (B) 20 to 60% by weight of an ethylene-α-olefin copolymer having a density of 850 to 910 kg/m$^3$, and a melt flow rate of 0.05 to 80 g/10 minutes measured at 230° C. under a load of 21.18 N, and (C) 20 to 60% by weight of a propylene resin, the total amount of the components (A) to (C) being 100% by weight; and an air-bag cover comprising a thermoplastic elastomer composition produced according to said process.

15 Claims, No Drawings

PROCESS FOR PRODUCING THERMOPLASTIC ELASTOMER COMPOSITION, AND AIR-BAG COVER

FIELD OF THE INVENTION

The present invention relates to a process for producing a thermoplastic elastomer composition, and an air-bag cover comprising a thermoplastic elastomer composition produced according to said process.

BACKGROUND OF THE INVENTION

There are known the following compositions used for making an air-bag cover:

(1) an olefin-based thermoplastic elastomer composition containing (a) 20 to 60 parts by weight of a propylene-ethylene random copolymer having a melt flow rate of 10 to 120 g/10 minutes measured at 230° C. under a load of 2.16 kg, and containing an ethylene unit in an amount of 2.0 to 4.5% by weight, (b) 5 to 40 parts by weight of a low-density polyethylene, and (c) 60 to 20 parts by weight of an ethylene-based copolymer rubber having a Mooney viscosity ($ML_{1+4}$, 100° C.) of 50 to 120 (JP 8-27331A);

(2) a thermoplastic elastomer composition having a flexural modulus of 100 to 600 MPa and a coefficient of linear expansion of $9 \times 10^{-5}$ cm/cm/° C. or smaller, which comprises (A) 30 to 70% by weight of a propylene-based copolymer resin, and (B) 70 to 30% by weight of a copolymer rubber of ethylene with an α-olefin having 4 or more carbon atoms (JP 10-265628A);

(3) an olefin-based thermoplastic elastomer comprising (A) a propylene-based resin and (B) an olefin-based copolymer rubber, and having a ratio ($N_1$/SS) of first normal stress difference ($N_1$) to shear stress (SS) of 0.6:1 to 1.4:1 said first normal stress difference ($N_1$) and shear stress (SS) being determined by subjecting said elastomer to step shear test at a temperature of 200° C. and a shear rate of 25.1 sec$^{-1}$ (U.S. Pat. No. 6,476,139B2 corresponding to JP 2001-279030A).

The term "air-bag cover" in the present invention means a cover used for holding an air-bag, especially a life-saving automotive air-bag.

SUMMARY OF THE INVENTION

However, there is a problem in that any air-bag cover made from the above-mentioned respective compositions is insufficient in its low-temperature impact strength.

In view of the above-mentioned problem in the conventional art, the present invention has an object to provide an air-bag cover excellent in its low-temperature impact strength, and a process for producing a thermoplastic elastomer composition suitably used for producing said air-bag cover.

The present invention is a process for producing a thermoplastic elastomer composition, which comprises the step of crosslinking dynamically at least the following components (A) to (C) in the presence of a crosslinking agent:

(A) 10 to 50% by weight of an oil-extended ethylene-α-olefin-non-conjugated diene copolymer rubber having a density of 850 to 900 kg/m$^3$, and a Mooney viscosity ($ML_{1+4}$ 100° C.) of 30 to 150;

(B) 20 to 60% by weight of an ethylene-α-olefin copolymer having a density of 850 to 910 kg/m$^3$, and a melt flow rate of 0.05 to 80 g/10 minutes measured at 230° C. under a load of 21.18 N; and (C) 20 to 60% by weight of a propylene resin, wherein the total amount of the components (A) to (C) is 100% by weight.

Also, the present invention is an air-bag cover comprising a thermoplastic elastomer composition produced according to the above-mentioned process.

DETAILED DESCRIPTION OF THE INVENTION

The above-mentioned oil-extended ethylene-α-olefin-non-conjugated diene copolymer rubber regarding the component (A) means a mixture of an ethylene-α-olefin-non-conjugated diene copolymer rubber with a softening agent, namely, means an ethylene-α-olefin-non-conjugated diene copolymer rubber extended by a softening agent. The softening agent is also called an extender oil or an extender in the art. Examples of a method for mixing an ethylene-α-olefin-non-conjugated diene copolymer rubber with a softening agent are (1) a method comprising the step of mixing an ethylene-α-olefin-non-conjugated diene copolymer rubber as a finished product with a softening agent with a mixing machine known in the art, wherein the ethylene-α-olefin-non-conjugated diene copolymer rubber may be a copolymer rubber on the market, and (2) a method comprising the steps of (1-1) mixing a solution of an ethylene-α-olefin-non-conjugated diene copolymer rubber in a solvent with a softening agent, thereby producing a mixture, and (1-2) removing the solvent contained in the mixture, wherein said solution is an intermediate product produced in a production process of said copolymer rubber. The component (A) may be an oil-extended copolymer rubber on the market.

An example of the softening agent is mineral oil such as paraffinic mineral oil, naphthenic mineral oil, and aromatic mineral oil. Among them, preferred is paraffinic mineral oil. The component (A) contains the softening agent in an amount of generally 20 to 200 parts by weight, preferably 40 to 150 parts by weight, and further preferably 60 to 110 parts by weight, per 100 parts by weight of the ethylene-α-olefin-non-conjugated diene copolymer rubber. When said amount is smaller than 20 parts by weight, a thermoplastic elastomer composition produced may be bad in its flowability. When said amount is larger than 200 parts by weight, a thermoplastic elastomer composition produced may be low in its low-temperature impact strength. The softening agent may also be contained in the component (A) in such an amount as to keep a Mooney viscosity ($ML_{1+4}$ 100° C.) of the oil-extended ethylene-α-olefin-non-conjugated diene copolymer rubber regarding the component (A) within the above-mentioned range of 30 to 150.

The above-mentioned α-olefin generally has 3 to 10 carbon atoms. Examples of the α-olefin are a linear α-olefin such as propylene, 1-butene, 1-pentene, 1-hexene, 1-octene and 1-decene; and a branched α-olefin such as 3-methyl-1-butene and 3-methyl-1-pentene. Among them, preferred is propylene, 1-butene, 1-hexene or 1-octene.

Examples of the above-mentioned non-conjugated diene are a chain non-conjugated diene such as 1,4-hexadiene, 1,6-octadiene, 2-methyl-1,5-hexadiene, 6-methyl-1,5-heptadiene, and 7-methyl-1,6-octadiene; and a cyclic non-conjugated diene such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene, and 6-chloromethyl-5-isopropenyl-2-norbornene. Among them, preferred is 5-ethylidene-2-norbornene or dicyclopentadiene.

The above-mentioned non-conjugated diene may be used in combination with a non-conjugated triene such as 2,3-diisopropylidene-5-norbornene, 2-ethylidene-3-isopropylidene-5-norbornene, 2-propenyl-2,2-norbornadiene, 1,3,7-octatriene, and 1,4,9-decatriene. When using said combination, the copolymer rubber regarding the component (A) is an ethylene-α-olefin-non-conjugated diene-non-conjugated triene copolymer rubber.

Examples of the oil-extended ethylene-α-olefin-non-conjugated diene copolymer rubber regarding the component (A) are an oil-extended ethylene-propylene-5-ethylidene-2-norbornene copolymer rubber, an oil-extended ethylene-propylene-1-butene-5-ethylidene-2-norbornene copolymer rubber, an oil-extended ethylene-1-hexene-5-ethylidene-2-norbornene copolymer rubber, an oil-extended ethylene-1-octene-5-ethylidene-2-norbornene copolymer rubber, an oil-extended ethylene-propylene-dicyclopentadiene copolymer rubber, and an oil-extended ethylene-1-butene-dicyclopentadiene copolymer rubber. Among them, preferred is an oil-extended ethylene-1-butene-dicyclopentadiene copolymer rubber, or an oil-extended ethylene-propylene-5-ethylidene-2-norbornene copolymer rubber.

The component (A) contains an ethylene unit in an amount of generally 30 to 90% by weight, preferably 35 to 80% by weight, and more preferably 40 to 70% by weight; and an α-olefin unit in an amount of generally 10 to 70% by weight, preferably 20 to 65% by weight, and more preferably 30 to 60% by weight, wherein the total amount of both units is 100% by weight. The term such as the "ethylene unit" means a unit of a polymerized monomer. When the amount of the α-olefin unit contained in the component (A) is smaller than 10% by weight or larger than 70% by weight, a thermoplastic elastomer composition produced may be low in its low-temperature strength. Each of the ethylene unit and the α-olefin unit may also be contained in the component (A) in such an amount as to keep a density of the oil-extended ethylene-α-olefin-non-conjugated diene copolymer rubber regarding the component (A) within the above-mentioned range of 850 to 900 kg/m$^3$.

From a viewpoint of endurance properties, heat resistance, low-temperature strength, and flowability of a thermoplastic elastomer composition produced, the component (A) contains a non-conjugated diene unit in an amount of generally 0.1 to 40, preferably 0.1 to 30, and more preferably 0.1 to 20 in terms of an iodine value of the ethylene-α-olefin-non-conjugated diene copolymer rubber (not the oil-extended copolymer rubber) regarding the component (A). When using the non-conjugated diene in combination with the above-mentioned non-conjugated triene, the above-mentioned amount is the total amount of the non-conjugated diene unit and the non-conjugated triene unit. When the iodine value is smaller than 0.1, there may be produced a thermoplastic elastomer composition having a week shear rate-dependence of its viscosity, and as a result, the thermoplastic elastomer composition may be bad in its flowability. When the iodine value is larger than 40, the thermoplastic elastomer composition may be low in its low-temperature strength.

The component (A) has a density of 850 to 900 kg/m$^3$, preferably 850 to 890 kg/m$^3$, and more preferably 850 to 880 kg/m$^3$ measured according to JIS K7112 without annealing, wherein "JIS" means Japanese Industrial Standards. Said density of higher than 900 kg/m$^3$ may result in poor low-temperature strength of a thermoplastic elastomer composition produced. Said density of lower than 850 kg/m$^3$ may result in poor high-temperature strength thereof.

The component (A) has a Mooney viscosity (ML$_{1+4}$ 100° C.) of 30 to 150, preferably 40 to 100, and more preferably 50 to 80 measured according to JIS K6300. Said Mooney viscosity of higher than 150 may result in poor flowability of a thermoplastic elastomer composition produced, or in poor appearance of a molded article comprising said composition. Said Mooney viscosity of lower than 30 may result in poor low-temperature strength of the thermoplastic elastomer composition.

Example of a polymerization method of monomers regarding the component (A) are a slurry polymerization method, a solution polymerization method, a bulk polymerization method, and a gas-phase polymerization method with a Ziegler-Natta catalyst known in the art, or a complex catalyst known in the art such as a metallocene catalyst and a non-metallocene catalyst.

An ethylene-α-olefin copolymer regarding the component (B) is preferably a copolymer (i) containing an ethylene unit in an amount of 30 to 90% by weight, preferably 35 to 80% by weight, and more preferably 40 to 70% by weight, and an α-olefin unit having 3 to 10 carbon atoms in an amount of 10 to 70% by weight, preferably 20 to 65% by weight, and more preferably 30 to 60% by weight, wherein the total amount of both units is 100% by weight, and (ii) having a melting point at a temperature lower than 100° C. or having no melting point measured according to JIS K7121 at a temperature-rising rate of 5° C./minute and at a temperature-dropping rate of 5° C./minute, in order to improve flexibility of a molded article comprising a thermoplastic elastomer composition produced. The amount of smaller than 10% by weight of the α-olefin unit, or larger than 70% by weight thereof may result in poor low-temperature strength of the thermoplastic elastomer composition. Each of the ethylene unit and the α-olefin unit may also be contained in the ethylene-α-olefin copolymer regarding the component (B) in such an amount as to keep a density of the component (B) within the above-mentioned range of 850 to 910 kg/m$^3$.

Examples of the above-mentioned α-olefin are a linear α-olefin such as propylene, 1-butene, 1-pentene, 1-hexene, 1-octene and 1-decene; and a branched α-olefin such as 3-methyl-1-butene and 3-methyl-1-pentene. Among them, preferred is 1-butene, 1-hexene or 1-octene.

Examples of the component (B) are an ethylene-1-butene copolymer, an ethylene-1-hexene copolymer, an ethylene-1-octene copolymer, an ethylene-propylene-1-butene copolymer, and an ethylene-1-butene-1-hexene copolymer. Among them, preferred is an ethylene-1-butene copolymer or an ethylene-1-octene copolymer.

The component (B) has a density of 850 to 910 kg/m$^3$, preferably 850 to 880 kg/m$^3$, and more preferably 850 to 870 kg/m$^3$ measured according to JIS K7112 without annealing. Said density of higher than 910 kg/m$^3$ may result in poor low-temperature strength of a thermoplastic elastomer composition produced.

The component (B) has a melt flow rate of 0.05 to 80 g/10 minutes, preferably 0.1 to 40 g/10 minutes, and more preferably 0.1 to 10 g/10 minutes measured according to JIS K7210 at 230° C. under a load of 21.18 N. Said melt flow rate of lower than 0.05 g/10 minutes may result in poor flowability of a thermoplastic elastomer composition produced, or in poor appearance of a molded article comprising said composition. Said melt flow rate of higher than 80 g/10 minutes may result in poor low-temperature strength of a thermoplastic elastomer composition produced.

Example of a polymerization method of monomers regarding the component (B) are a slurry polymerization method, a solution polymerization method, a bulk polymerization method, and a gas-phase polymerization method with a Ziegler-Natta catalyst known in the art, or a complex catalyst known in the art such as a metallocene catalyst and a non-metallocene catalyst. The component (B) may be a copolymer on the market.

The component (C) is (i) a propylene homopolymer having a melting point at 100° C. or higher measured according to JIS K7121 at a temperature-rising rate of 5° C./minute and at a temperature-dropping rate of 5° C./minute, or (ii) a random or block copolymer of propylene with ethylene and/or α-olefin having 4 to 10 carbon atoms, which copolymer contains a propylene unit in an amount of larger than 50% by weight and smaller than 100% by weight, the total amount of the propylene unit, the ethylene unit and the α-olefin unit being 100% by weight, and which copolymer has a melting point at 100° C. or higher measured according to JIS K7121 at a temperature-rising rate of 5° C./minute and at a temperature-dropping rate of 5° C./minute. The component (C) may be a combination of two or more of said homopolymer, said random copolymer and said block copolymer.

In order to produce a thermoplastic elastomer composition having an improved heat resistance, the above-mentioned random copolymer is preferably (1) a propylene-ethylene random copolymer containing a propylene unit in an amount of 90 to 99.5% by weight, and an ethylene unit in an amount of 0.5 to 10% by weight, the total amount of both units being 100% by weight, (2) a propylene-ethylene-α-olefin random copolymer containing a propylene unit in an amount of 80 to 99% by weight, an ethylene unit in an amount of 0.5 to 10% by weight, and an α-olefin unit having 4 to 10 carbon atoms in an amount of 0.5 to 10% by weight, the total amount of those units being 100% by weight, or (3) a propylene-α-olefin random copolymer containing a propylene unit in an amount of 90 to 99.5% by weight, and an α-olefin unit having 4 to 10 carbon atoms in an amount of 0.5 to 10% by weight, the total amount of both units being 100% by weight.

The above-mentioned block copolymer (1) can be produced according to a process comprising the steps of (1-1) producing a first polymer of a propylene homopolymer or a random copolymer of propylene with ethylene and/or α-olefin, and (1-2) producing a second polymer in the presence of the first polymer, the second polymer being a random copolymer of propylene with ethylene and/or α-olefin, wherein an amount of monomer unit(s) other than a propylene unit contained in the second polymer (namely, an amount of an ethylene unit contained in the second polymer, an amount of an α-olefin unit contained therein, or the total amount of an ethylene unit and an α-olefin unit contained therein) is larger than an amount of monomer unit(s) other than a propylene unit contained in the first polymer (namely, an amount of an ethylene unit contained in the first polymer, an amount of an α-olefin unit contained therein, or the total amount of an ethylene unit and an α-olefin unit contained therein), and (2) is a polymer blend containing respective polymers such as the first polymer and the second polymer mentioned above. The polymer produced according to the above-mentioned process is not a true block copolymer consisting of a polymer block of the first polymer produced in the step (1-1) and a polymer block of the second polymer produced in the step (1-2); namely, the polymer produced according to the above-mentioned process is not a block copolymer such as a styrene-butadiene block copolymer, SSS - - - SSSBBB - - - BBB (S is a styrene unit, SSS - - - SSS is a styrene polymer block, B is a butadiene unit, and BBB - - - BBB is a butadiene polymer block), which is a typical block copolymer exemplified in a polymer textbook. The reason why a polymer produced according to the above-mentioned process is usually called a block copolymer by those skilled in the art may be that said process comprises multiple steps such as two steps contained in the above-exemplified process.

In order to produce a thermoplastic elastomer composition having an improved heat resistance, the above-mentioned block copolymer preferably contains monomer unit(s) other than a propylene unit in the first polymer in an amount of 0.5 to 10% by weight, the total amount of all the monomer units contained in the first polymer being 100% by weight; more preferably contains monomer unit (s) other than a propylene unit in the second polymer in an amount of 5 to 50% by weight, the total amount of all the monomer units contained in the second polymer being 100% by weight; and further preferably contains the second polymer in an amount of 5 to 70% by weight, an amount of said block copolymer being 100% by weight.

Examples of the above-mentioned α-olefin having 4 to 10 carbon atoms regarding the component (C) are a linear α-olefin such as 1-butene, 1-pentene, 1-hexene, 1-octene and 1-decene; a branched α-olefin such as 3-methyl-1-butene and 3-methyl-1-pentene; and a combination of two or more thereof. Among them, preferred is 1-butene or 1-hexene.

In order to improve appearance of a molded article comprising a thermoplastic elastomer composition produced, the component (C) has a melt flow rate of preferably 0.1 g/10 minutes or higher, and more preferably 1 g/10 minutes or higher measured according to JIS K7210 at 230° C. under a load of 21.18 N. Said melt flow rate is preferably 150 g/10 minutes or lower, and more preferably 100 g/10 minutes or lower in order to improve low-temperature strength of the thermoplastic elastomer composition.

Example of a polymerization method of monomers regarding the component (C) are a slurry polymerization method, a solution polymerization method, a bulk polymerization method, and a gas-phase polymerization method with a Ziegler-Natta catalyst known in the art, or a complex catalyst known in the art such as a metallocene catalyst and a non-metallocene catalyst. The component (C) may be a copolymer on the market.

Examples of the component (C) are a propylene homopolymer, an ethylene-propylene random copolymer, an ethylene-propylene-butene random copolymer, an ethylene-propylene block copolymer, and an ethylene-propylene-butene block copolymer. Among them, preferred is a propylene homopolymer, an ethylene-propylene random copolymer, or an ethylene-propylene block copolymer.

An amount of the component (A) is 10 to 50% by weight, preferably 10 to 45% by weight, and more preferably 10 to 40% by weight, an amount of the component (B) is 20 to 60% by weight, preferably 25 to 55% by weight, and more preferably 30 to 50% by weight, and an amount of the component (C) is 20 to 60% by weight, preferably 25 to 50% by weight, and more preferably 30 to 40% by weight, wherein the total amount of the components (A) to (C) is 100% by weight.

When said amount of the component (A) is smaller than 10% by weight, or when said amount of the component (B) is smaller than 20% by weight (namely, when said amount of the component (C) is larger than 60% by weight), a thermoplastic elastomer composition produced may be poor in its low-temperature strength. When said amount of the component (A) is larger than 50% by weight, or when said amount of the component (B) is larger than 60% by weight (namely, when said amount of the component (C) is smaller than 20% by weight), the thermoplastic elastomer composition may be poor in its flowability, or a molded article comprising the thermoplastic elastomer composition may be poor in its appearance.

Examples of the above-mentioned crosslinking agent are an organic peroxide, a sulfur-containing compound, and an alkylphenol resin. Among them, preferred is an organic peroxide.

Examples of the organic peroxide are ketone peroxides, diacyl peroxides, hydroperoxides, dialkyl peroxides, peroxyketals, alkyl peresters, percarbonates, peroxydicarbonates, and peroxyesters. Specific examples of the organic peroxide are dicumyl peroxide, 2,5-dimethyl-2,5-di(tert-butylperoxy)hexane, 2,5-dimethyl-2,5-di(tert-butylperoxy)hexyne, 1,3-bis(tert-butylperoxyisopropyl)benzene, tert-butyl cumyl peroxide, di-tert-butyl peroxide, 2,2,4-trimethylpentyl-2-hydroperoxide, diisopropylbenzohydroperoxide, cumene peroxide, tert-butyl peroxide, 1,1-di(tert-butylperoxy)-3,5,5-trimethylcyclohexane, 1,1-di-tert-butylperoxycyclohexane, isobutyl peroxide, 2,4-dichlorobenzoyl peroxide, o-methylbenzoyl peroxide, bis-3,5,5-trimethylhexanoyl peroxide, lauroyl peroxide, benzoyl peroxide, and p-chlorobenzoyl peroxide; and a combination of two or more thereof.

An amount of the crosslinking agent is generally 0.01 to 10 parts by weight, preferably 0.05 to 1 part by weight, and more preferably 0.1 to 0.5 part by weight, wherein the total amount of the components (A) to (C) is 100 parts by weight. Said amount of smaller than 0.01 part by weight may result in poor flowability of a thermoplastic elastomer composition produced. Said amount of larger than 10 parts by weight may result in poor low-temperature strength of the thermoplastic elastomer composition.

The crosslinking agent may be combined with a crosslinking co-agent in order to improve low-temperature strength of a thermoplastic elastomer composition produced. A preferable crosslinking co-agent is a compound having two or more double bonds. Examples of the crosslinking co-agent are N,N-m-phenylenebismaleimide, toluylenebismaleimide, p-quinone dioxime, nitrosobenzene, diphenylguanidine, trimethylolpropane, trimethylolpropane trimethacrylate, and divinylbenzene; and a combination of two or more thereof.

An amount of the crosslinking co-agent is preferably 0.01 to 10 parts by weight per 100 parts by weight of the total amount of the components (A) to (C). Said amount of smaller than 0.01 part by weight may result in poor low-temperature strength of a thermoplastic elastomer composition produced. Said amount of larger than 10 parts by weight may result in poor improvement in low-temperature strength of the thermoplastic elastomer composition.

Any of the components (A) to (C) may be combined with a slip agent or a silicone compound in order to improve (i) a releasing property from a mold of a molded article comprising a thermoplastic elastomer composition produced, (ii) an abrasion resistance thereof, and (iii) an anti-scratch property thereof. Examples of the slip agent are lauricamide, palmiticamide, stearicamide, oleicamide, erucicamide, N,N'-methylenebisstearicamide, N,N'-ethylenebisstearicamide, N,N'-ethylenebisoleicamide, and N,N'-stearyldiethanolicamide; and a combination of two or more thereof. Among them, preferred is stearicamide, oleicamide, or erucicamide.

In view of the above-mentioned releasing property, abrasion resistance and anti-scratch property, an amount of the slip agent is preferably 0.01 to 10 parts by weight, and more preferably 0.05 to 1 part by weight per 100 parts by weight of the total amount of the components (A) to (C). When said amount is smaller than 0.01 part by weight, said releasing property, abrasion resistance or anti-scratch property may be poor. When said amount is larger than 10 parts by weight, a molded article comprising a thermoplastic elastomer composition produced may have a slip agent bleeding on its surface.

Examples of the above-mentioned silicone compound are a straight silicone compound such as dimethylsilicone, methylphenylsilicone, and methylhydrogensilicone; and a modified silicone compound such as an amino-modified silicone, an epoxy-modified silicone, a carboxyl-modified silicone, a carbinol-modified silicone, a methacryl-modified silicone, a mercapto-modified silicone, a phenol-modified silicone, a polyether-modified silicone, a methylstylyl-modified silicone, an alkyl-modified silicone, a higher fatty acid ester-modified silicone, a higher alkoxy-modified silicone, and a fluorine-modified silicone. Among them, preferred is a straight silicone compound. The above-mentioned silicone compound used in the present invention may be a masterbatch, which contains silicone oil and/or silicone rubber as the silicone compound in high concentration blended with an olefin resin.

In view of the above-mentioned releasing property, abrasion resistance and anti-scratch property, an amount of the silicone compound is preferably 0.01 to 10 parts by weight, and more preferably 0.1 to 5 parts by weight per 100 parts by weight of the total amount of the components (A) to (C). When said amount is smaller than 0.01 part by weight, said releasing property, abrasion resistance or anti-scratch property may be poor. When said amount is larger than 10 parts by weight, a molded article comprising a thermoplastic elastomer composition produced may have color heterogeneity on its surface.

Further, any of the components (A) to (C) may be combined with an additive such as an inorganic filler (for example, talc, calcium carbonate and calcined kaolin), an organic filler (for example, fiber, wood flour and cellulose powder), an antioxidant (for example, phenol antioxidant, sulfur antioxidant, phosphor antioxidant, lactone antioxidant and vitamin antioxidant), an antiweatherable agent, an ultraviolet absorber (for example, benzotriazole absorber, tridiamine absorber, anilide absorber and benzophenone absorber), a heat stabilizer, a light stabilizer (for example, hindered amine stabilizer and benzoate stabilizer), an antistatic agent, an nucleating agent, a pigment, an adsorbent (for example, metal oxide such as zinc oxide and magnesium oxide), a metal chloride (for example, iron chloride and calcium chloride), hydrotalcite, and an aluminate. Those additives may also be blended with a thermoplastic elastomer composition produced.

The "step of crosslinking dynamically" in the present invention means a step of crosslinking under a shear stress. An example of an apparatus used in said step is that known in the art such as a twin-screw extruder and a Banbury mixer. Examples of said step are (1) a step of melt-kneading at 160° C. for 10 minutes with a Banbury mixer having a 16 liter volume at a rotor-rotation speed of 60 rpm, and (2) a step of melt-kneading at 200° C. with a twin-screw extruder having a screw diameter of 44 mm at a screw-rotation speed of 200 rpm. Among them, preferred is a step of melting the component (A) in a twin-screw extruder in advance, and then, feeding the components (B) and (C) thereto to melt-knead them.

A thermoplastic elastomer composition produced according to the process of the present invention is suitably used for producing an air-bag cover. Said thermoplastic elastomer composition can be molded to the air-bag cover of the present invention according to a molding method known in the art such as an injection-molding method. Said air-bag cover can suitably be used for a driver-side air-bag cover, which comprises a thermoplastic elastomer composition having stiffness of preferably 100 to 400 MPa. Further, said air-bag cover can suitably be used for an air-bag cover of a membrane switch-carrying air-bag apparatus, which air-bag cover comprises a thermoplastic elastomer composition having stiffness of preferably 100 to 200 MPa. An example of said membrane switch-carrying air-bag apparatus is an air-bag apparatus, wherein a switch of a horn system is a membrane switch, said switch being set between a driver-side air-bag cover and a driver-side air-bag, or being set inside a driver-side air-bag cover.

EXAMPLE

The present invention is explained with reference to the following Examples, which do not limit the scope of the present invention.

Example 1

There were melt-kneaded at 100° C. for 5 minutes with a 16 liter-volume Banbury mixer at a rotor-rotation speed of 68 rpm (1) 30% by weight of an oil-extended ethylene-propylene-5-ethylidene-2-norbornene copolymer rubber (component (A)), which has a trade name of ESPRENE 670F manufactured by Sumitomo Chemical Co., Ltd., a density of 880 kg/m$^3$, and a Mooney viscosity (ML$_{1+4}$ 100° C.) of 53, and which contains equi-amount by weight of paraffinic mineral oil and the above-mentioned copolymer rubber (1-1) containing an ethylene unit in an amount of 30% by weight and a propylene unit in an amount of 70% by weight, the total amount of both units being 100% by weight, and (1-2) having an iodine value of 11.5, (2) 30% by weight of an ethylene-1-octene copolymer (component (B)), which has a trade name of ENGAGE 8180 manufactured by DupontDow, a density of 863 kg/m$^3$, and a melt flow rate of 0.5 g/10 minutes measured according to JIS K7210 at 230° C. under a load of 21.18 N, and which contains an ethylene unit in an amount of 58% by weight and a 1-octene unit in an amount of 42% by weight, the total amount of both units being 100% by weight, (3) 40% by weight of an ethylene-propylene random copolymer (component (C)), which has a trade name of MARLEX RLC-350 manufactured by PSPC, and a melt flow rate of 35 g/10 minutes measured according to JIS K7210 at 230° C. under a load of 21.18 N, and which contains an ethylene unit in an amount of 3.5% by weight and a propylene unit in an amount of 96.5% by weight, the total amount of both units being 100% by weight, and (4) 0.13 part by weight of trimethylolpropane trimethacrylate (crosslinking co-agent), wherein the total amount of the components (A) to (C) is 100% by weight and also 100 parts by weight, thereby producing a melt-kneaded product. Said melt-kneaded product was palletized, thereby producing pellets.

There was carried out the step of crosslinking dynamically by (i) putting said pellets in a 44 mm screw diameter-carrying twin-screw extruder having a screw rotation speed of 250 rpm, and a cylinder temperature of 200° C., and then, (ii) adding to said twin-screw extruder 2.2 parts by weight of a mixture of 2,5-dimethyl-2,5-di(tert-butylperoxy)hexane (crosslinking agent) with paraffinic mineral oil, wherein said mixture contained said crosslinking agent in a concentration of 10%, and therefore, the above-mentioned 2.2 parts by weight of said mixture contained 0.22 part by weight of said crosslinking agent, the total amount of the components (A) to (C) being 100 parts by weight, thereby producing a thermoplastic elastomer composition with a production rate of 50 kg/hour.

Said thermoplastic elastomer composition was injection-molded, thereby producing a molded article. Said molded article was evaluated to obtain the following results summarized in Table 1:

flexural modulus of 120 MPa measured according to JIS K7203;

Izod impact strength of non-break measured at −50° C. according to JIS K6911;

heat sag (index of heat resistance) of 46 mm measured at 120° C. for 2 hours according to JIS K7195;

flow length (index of flowability) of 594 mm; and melt flow rate of 9 g/10 minutes measured according to JIS K7210 at 230° C. under a load of 21.18 N.

The above-mentioned flow length was measured according to a method comprising the steps of:

(1) injection-molding a thermoplastic elastomer composition under an injection pressure of 116 MPa with an injection molding machine having a trade name of IS 100-EN manufactured by Toshiba Machine Co., Ltd., equipped with an elliptic spiral mold having 2 mm thickness and temperature of 50° C., thereby obtaining an injection-molded spiral article, wherein a cylinder temperature of said injection molding machine was 190° C. in its cylinder-1, 200° C. in its cylinder-2, 220° C. in its cylinder-3, and 220° C. in its downstream end, the cylinder being composed of three blocks of the cylinder-1, cylinder-2 and cylinder-3 arranged in this order from the upstream of the cylinder to the downstream thereof;

(2) measuring length (L) of said injection-molded spiral article; and (3) calculating flow length according to the following formula, Flow length=Length (L)/Thickness (2 mm).

Example 2

Example 1 was repeated except that an amount of the component (A) was changed to 20% by weight, and an amount of the component (B) was changed to 40% by weight. Results are shown in Table 1.

Comparative Example 1

Example 1 was repeated except that (1) the component (A) was changed to 60% by weight of an oil-extended ethylene-propylene-5-ethylidene-2-norbornene copolymer rubber, which has a trade name of ESPRENE 673 manufactured by Sumitomo Chemical Co., Ltd., a density of 880 kg/m$^3$, and a Mooney viscosity (ML$_{1+4}$ 100° C.) of 76, and which contains 100 parts by weight of paraffinic mineral oil and 40 parts by weight of the above-mentioned copolymer rubber (1-1) containing an ethylene unit in an amount of 70% by weight and a propylene unit in an amount of 30% by weight, the total amount of both units being 100% by weight, and (1-2) having an iodine value of 10, and (2) the component (B) was not used. Results are shown in Table 1.

Comparative Example 2

Example 1 was repeated except that (1) the component (A) was changed to 60% by weight of an ethylene-propylene-5-ethylidene-2-norbornene copolymer rubber having a trade name of NODEL 3722P manufactured by DupontDow, a density of 880 kg/m$^3$, a Mooney viscosity (ML$_{1+4}$ 100° C.) of 35, and an iodine value of 1, and containing an ethylene unit in an amount of 70% by weight and a propylene unit in an amount of 30% by weight, the total amount of both units being 100% by weight, (2) the component (B) was not used, and (3) an amount of the crosslinking agent was changed to 0.32 part by weight. Results are shown in Table 1.

TABLE 1

|  | Example | | Comparative Example | |
|---|---|---|---|---|
|  | 1 | 2 | 1 | 2 |
| Component (A) (% by weight) | | | | |
| ESPRENE 670F | 30 | 20 | | |
| ESPRENE 673 | | | 60 | |
| NODEL 3722P | | | | 60 |
| Component (B) (% by weight) | | | | |
| ENGAGE 8180 | 30 | 40 | | |
| Component (C) (% by weight) | | | | |
| MARLEX RLC-350 | 40 | 40 | 40 | 40 |
| Crosslinking agent (part by weight) | 0.22 | 0.22 | 0.22 | 0.32 |
| Crosslinking co-agent (part by weight) | 0.13 | 0.13 | 0.13 | 0.13 |
| Evaluation | | | | |
| Flexural modulus (MPa) | 120 | 130 | 140 | 140 |
| Izod impact strength | non-break | non-break | break | break |
| Heat sag (mm) | 46 | 42 | 38 | 42 |
| Flow length (mm) | 594 | 380 | 504 | 327 |
| Melt flow rate (g/10 minutes) | 9 | 4 | 10 | 2 |

The invention claimed is:

1. A process for producing a thermoplastic elastomer composition, which comprises the step of crosslinking dynamically at least the following components (A) to (C) in the presence of a crosslinking agent:
    (A) 10 to 50% by weight of an oil-extended ethylene-α-olefin-non-conjugated diene copolymer rubber having a density of 850 to 900 kg/m³, and a Mooney viscosity ($ML_{1+4}$ 100° C.) of 30 to 150;
    (B) 20 to 60% by weight of an ethylene-α-olefin copolymer having a density of 850 to 880 kg/m³, and a melt flow rate of 0.05 to 80 g/10 minutes measured at 230° C. under a load of 21.18 N; and
    (C) 20 to 60% by weight of a propylene resin,
wherein the total amount of the components (A) to (C) is 100% by weight.

2. The process for producing a thermoplastic elastomer composition according to claim 1, wherein the crosslinking agent is an organic peroxide.

3. The process for producing a thermoplastic elastomer composition according to claim 1, wherein the oil-extended ethylene-α-olefin-non-conjugated diene copolymer rubber is an oil-extended ethylene-1-butene-dicyclopentadiene copolymer rubber or an oil-extended ethylene-propylene-5-ethylidene-2-norbornene copolymer rubber.

4. The process for producing a thermoplastic elastomer composition according to claim 1, wherein the oil-extended ethylene-α-olefin-non-conjugated diene copolymer rubber contains an ethylene unit in an amount of 30 to 90% by weight, and an α-olefin unit in an amount of 10 to 70% by weight, the total amount of both units being 100% by weight, and the ethylene-α-olefin-non-conjugated diene copolymer rubber contained in the oil-extended ethylene-α-olefin-non-conjugated diene copolymer rubber has an iodine value of 0.1 to 40.

5. The process for producing a thermoplastic elastomer composition according to claim 1, wherein the ethylene-α-olefin copolymer is an ethylene-1-butene copolymer or an ethylene-1-octene copolymer.

6. The process for producing a thermoplastic elastomer composition according to claim 1, wherein the ethylene-α-olefin copolymer contains an ethylene unit in an amount of 30 to 90% by weight, and an α-olefin unit in an amount of 10 to 70% by weight, the total amount of both units being 100% by weight.

7. The process for producing a thermoplastic elastomer composition according to claim 1, wherein the propylene resin is a propylene homopolymer, an ethylene-propylene random copolymer, or an ethylene-propylene block copolymer.

8. The process for producing a thermoplastic elastomer composition according to claim 1, wherein the dynamically crosslinking step is carried out by melting the component (A) in a twin-screw extruder in advance, and then, feeding the components (B) and (C) thereto to melt-knead them.

9. An air-bag cover comprising a thermoplastic elastomer composition produced according to the process of claim 1.

10. The air-bag cover according to claim 9, wherein the air-bag cover is a driver-side air-bag cover.

11. The air-bag cover according to claim 9, wherein the air-bag cover is an air-bag cover of a membrane switch-carrying air-bag apparatus.

12. The process for producing a thermoplastic elastomer composition according to claim 1, wherein the component (A) contains a softening agent in an amount of 20 to 200 parts by weight per 100 parts by weight of the ethylene-α-olefin-non-conjugated diene copolymer rubber.

13. The process for producing a thermoplastic elastomer composition according to claim 1, wherein the amount of the crosslinking agent is 0.01 to 10 parts by weight per 100 parts by weight of the total amount of the components (A) to (C).

14. The process for producing a thermoplastic elastomer composition according to claim 1, further comprising a crosslinking co-agent present in an amount of 0.01 to 10 parts by weight per 100 parts by weight of the total amount of the components (A) to (C).

15. The process for producing a thermoplastic elastomer composition according to claim 1, wherein the component (B) is selected from the group consisting of ethylene-1-butene copolymer, ethylene-1-hexene copolymer, and ethylene-1-octene copolymer.

* * * * *